United States Patent Office 3,840,611
Patented Oct. 8, 1974

3,840,611
PROCESS FOR PURIFYING OLEFINS
Georges Gau, Nancy, France, assignor to Agence Nationale de Valorisation de la Recherche (Anvar), Paris, France
Filed June 29, 1972, Ser. No. 267,728
Claims priority, application France, July 2, 1971, 7124289
Int. Cl. C07c 7/00
U.S. Cl. 260—677 A
18 Claims

ABSTRACT OF THE DISCLOSURE

The invention relates to a process for purifying a mixture of olefins by a removal of traces of oxygen, water, oxydes of carbon and acetylenic or diolefinic hydrocarbons, which comprises reacting said mixture with an organometallic derivative of a compound having mobile hydrogens and in which the metallic atoms are substituted in reversible manner for these mobile hydrogens.

---

The present invention relates to the purification of various olefins produced industrially from mineral oil fractions or from saturated hydrocarbons, by the removal of traces of oxygen, of water, of oxide of carbon, and of acetylenic and diolefinic hydrocarbons.

During the last twenty years, these olefins, of which a large part is used in polymerisation or copolymerisation processes, have had to be produced in higher and higher purity to satisfy the various users.

Selective hydrogenation over solid catalysts enables the content of acetylenic or diolefinic hydrocarbons of ethylene or of propylene to be reduced but a part of the olefin is itself hydrogenated which involves consequently a loss of yield. This loss is all the greater as the purity sought is greater. It is to be anticipated that in the near future users will seak purer and purer products—about 1 part per million of each of the above-mentioned impurities—and these specifications cannot be maintained without a considerable increase in the size of washing or of drying units and without a considerable loss of olefin by the hydrogenation reaction.

It is therefore an object of the invention to overcome the aforesaid drawbacks, in other words to achieve a very high degree of purity whilst reducing the losses of olefins.

The process according to the invention is characterized in that the mixture to be purified is made to react with an organometallic compound, preferably an organoalkali, derived from a compound having mobile hydrogens and in which the metallic atoms are substituted in reversible manner for these mobile hydrogens.

The compound with mobile hydrogens is advantageously constituted by an aromatic hydrocarbon or by an amine, the metal by lithium, sodium, and potassium, other alkaline metals being prohibitive in price.

The organometallic compounds, especially organoalkalis, of the type concerned are adapted to react in very active and selective manner, especially more selectively than hydrogen, with diacetylenic or diolefinic compounds, as with traces of oxygen, water, and carbon monoxide that the olefins contain. It hardly reacts with the treated olefins (by exchange of the metallic atom of the organoalkali compound with a hydrogen of olefine), this reaction called "transmetallation" being all the more negligible as the compound with mobile hydrogens from which the organoalkali compound used is derived has more affinity for metallic atoms or is more "acid" and as the olefin to be purified is less "acid."

In this respect it is observed that ethylene can in no way be "metallated" by organoalkali compounds of substitution derived from aromatic hydrocarbons or from tertiary amines. Other olefins, for example propylene, are a little more acid than ethylene, but much less than the majority of aromatic hydrocarbons and tertiary amines. It will ever suffice in all cases to have recourse to organoalkali compounds whose acidities are distinctly higher than that of the olefin to be purified (these organoalkali compounds then having pK distinctly higher than that of the olefin to reduce to a negligible amount the part of the olefin capable of undergoing metallation.

Advantageously, the reaction is carried out in the midst of an organic solvent.

Preferably, according to the invention, the speed of attack of this organoalkali compound is much increased by the use conjointly with this compound of a "basic complexant." The basic complexants to be used, of which the list is indicated in the following, have in addition the advantage of facilitating the solubilization (especially by the formation of chelates with the metallic atoms of the organoalkali compounds) of the organoalkali which under these conditions can be entirely attacked by the purities to be eliminated.

It thus becomes possible to solubilize up to two moles of organoalkali per liter of solvent.

The solution obtained is used to "wash" gaseous olefines in counter-current, this wash being effected either in a plate column, or in a lined column.

The olefins to be purified by the process of the present invention are generally lighter olefins, the only ones presently used to a high degree of purity in polymerization processes. The principal products are ethylene, propylene, isobutene and 1- and 2-butenes; if the operating pressure is not too high, there is hence no need to provide for reboiling, nor for liquid reflux. The solvent used must in this case have a sufficiently low volatility.

Other characteristics and advantages of the present invention emerge from the description which follows, with reference to the accompanying drawings, given by way of non-limiting examples.

Figure 1:
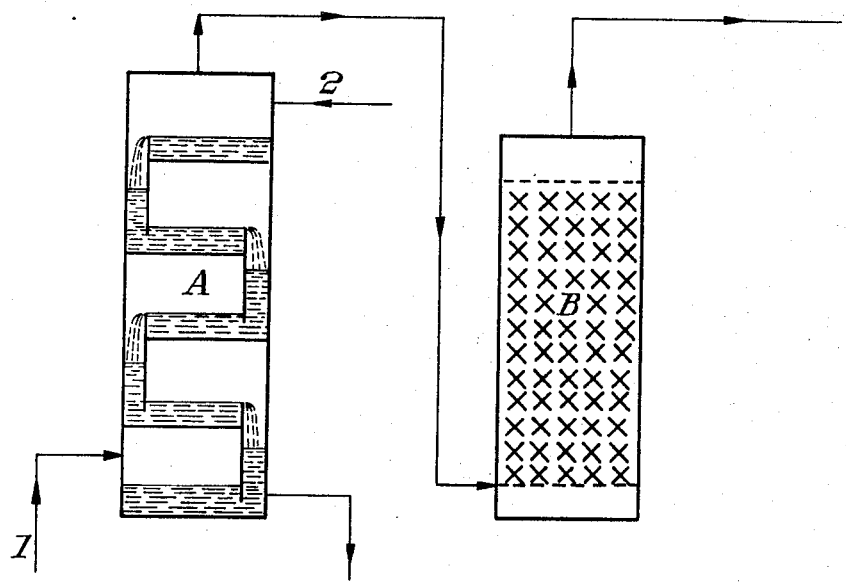
FIG. 1 is a diagrammatic illustration of the purifying column of a current of ethylene such as can be installed according to the invention, at the outlet of an industrial plant for production of ethylene.

With reference to FIG. 1, the ethylene to be treated, which has already been partially purified in the production plant by washing with soda, drying over silica gel, hydrogenation and distillation is introduced to the bottom of the washing column A.

The content of impurities of this ethylene is in general comprised within the following intervals:

$O_2$: 2 to 10 p.p.m. (volumetric ratio)
$H_2O$: 2 to 10 p.p.m. (volumertic ratio)
$CO_2$: 2 to 10 p.p.m. (volumertic ratio)
$CO$: 2 to 10 p.p.m. (volumertic ratio)
$C_2H_2$: 2 to 100 p.p.m. (volumetric ratio)

The purification treatment according to the invention may be applied to olefins, especially ethylene, obtained directly at the output of production units, especially at a pressure generally comprised between 15 and 40 bars, the washing being effected at this pressure.

The washing liquid is introduced at the top of the column: it comprises compounds of the three types indicated below.

(1) An organisodium subsitution compound of a mono or polycyclic aromatic hydrocarbon or of any organic amine. The hydrocarbons can be substituted by a number of alkyl groups. The organosodium compound is hence in this case an aryl or alkaryl-sodium, selected preferably for reasons of price, in the benzenic or naphthalenic series. An atom of sodium (metal preferred in this process) substitutes either a hydrogen of the aromatic nucleus, or a hydrogen at an α position of the alkyl group. The organic amines are of the primary or secondary type and can be substituted by any alkyl, cycloalkyl or aryl group. The atom of alkali metal substitutes a hydrogen fixed to the nitrogen and the organosodium compound is in this case a substituted sodium amide.

By way of example of the organosodium compound, there may be mentioned phenylsodium, benzylsodium, naphthylsodium, the metallate of one or two methylnaphtalene $C_{10}H_7CH_2Na$, the metallate of diphenylmethane $(C_6H_5)_2CHNa$, the amide of aniline $C_6H_5NHNa$, the amide of diisopropylamine, etc. . . . These compounds will be denoted in the following under the name of metallates: to the hydrocarbon or amine RH correspond therefore the metallate RNa.

It is generally preferable to use a hydrocarbon or amine metallate of low volatility since attack by water or acetylenes transforms RNa into RH which can therefore be partially vaporized and entrained in the gaseous current.

2) A basic complexant which is any tertiary amine, the groups fixed to the nitrogen being able to be alkyl, cycloalkyl or aryl groups. In summary it is necessary to avoid the amine from being metallated too much, preferentially to the RH compounds; this is why the non-tertiary amines cannot be used, since an atom linked directly to the nitrogen atom is always more mobile than an atom or hydrogen of an aromatic hydrocarbon. These amines have besides only a slight complexing activity.

Very good results are obtained with chelating polyamines, that is to say polyamines such that the distance between the two atoms of nitrogen enable the formation of a chelate with the atom of metal. These polyamines enable at the same time acceleration of the speed of reaction and considerable increase in the solubility of the organoalkalis. They are of a very particular advantage when it is desired to work in a homogeneous phase.

There may be mentioned as examples of chelating diamines the following products: NNN'N'-tetraalkylmethylenediamine, NNN'N' - tetraalkylethylenediamine, NNN'N'-tetraalkylpropylenediamine, NNN'N'-tetraalkyl 1,2-diamino-cyclohexane, etc. . . .; the alkyls selected are the groups methyl, ethyl, propyl or butyl.

More generally, the chelating polyamines, corresponding to the general formula:

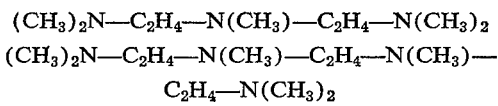

where x=1, 2, 3, 4; and where the groups R and R' are methyl ethyl, propyl, isopropyl, n-butyl, t-butyl, or cyclohexyl groups, enable very good results to be obtained. By way of examples of triamine and of tetramine, the two products of the formulae:

$(CH_3)_2N$—$C_2H_4$—$N(CH_3)$—$C_2H_4$—$N(CH_3)_2$ $(CH_3)_2N$—$C_2H_4$—$N(CH_3)$—$C_2H_4$—$N(CH_3)$—
$C_2H_4$—$N(CH_3)_2$ may be mentioned, which are easily prepared by methylation of diethylenetriamine and triethylenetetramine.

Polyamines of low volatility such as NNN'N''N''-pentamethyldiethylenetriamine, NNN'N'-tetramethyl-1,2-diaminocyclohexane, or NNN'N' - tetramethylethylenediamine, are preferred. The first and the third of these amines are of relatively low cost price, the second being more stable to heat, in the presence of metallates.

It is also possible to use tertiary monoamines such as triethylamine, tripolylamine, trybutylamine, NN-dimethylcyclohexylamine, or bridged amines such as triethylenediamine or quinuclidine. They can also serve for the solubilization of the organoalkali compound, especially organosodium, by resorting to the joint use, with a tertiary monoamine (for example dimethylcyclohexylamine) playing the role of Lewis base solvating the cation, of an organoaluminum compound or organomagnesium compound playing the role of Lewis acid and solvating the anion. The complexes obtained, sometimes called "ates" complexes, are at same time very reactive and very soluble in saturated or aromatic hydrocarbons or in tertiary monoamines.

For example, when the organoalkali basic compound is constituted by benzylsodium, the complexes can be obtained by reactions of the following type:

$4C_6H_5Na+AlCl_3 \rightarrow 3ClNa+NaAl(C_6H_5)_4$ $4C_6H_5Na+Al(O.R)_3 \rightarrow 3RONa+NaAl(C_6H_5)_4$ $2C_6H_5Na+C_6H_5MgBr \rightarrow BrNa+NaMg(C_6H_5)_3$ The attack of the phenylsodium being facilitated by the presence of tertiary monoamine.

(3) An organic solvent, which can be any mineral oil fraction of low volatility: a gas-oil treated with hydrogen would therefore be suitable. The solvent must be constituted principally by saturated aromatic or olefinic hydrocarbon. In purely aromatic solvents such as alkylaromatics (dodecylbenzene for example) the speed of attack of the organoalkali is generally very high.

The attack reactions of the organoalkali on any plate of the washing column shown in FIG. 1, are all irreversible under normal operating conditions and are extremely rapid at ambient temperatures; except for reaction of CO it has not been possible to measure the speed of reaction at 20° C., the only magnitude accessible being under these conditions the speed of diffusion between the gas and the liquid.

The study of the reaction of a metallate with the CO has enabled it to be verified that the speed of reaction is all the greater as the temperature and pressure are higher and the speed increases with the basicity of the anion R⁻. Thus the speed of attack of phenylsodium is ten times greater than that of benzylsodium; in the same way naphthylsodium is ten times more reactive than the metallate of 1-methylnaphtalene. These kinetic results have been obtained by means of a closed gas liquid reactor, vigorously shaken by a magnetic vibrator.

The number of plates, on which depends in particular the time of gas-liquid contact, is selected in the function of the desired purity, of the pressure of operation and of the temperature selected; an optimisation is to be effected in each case. The temperature is generally selected less than 50° C., but can reach 100° C. if NNN'N'-1,2-diaminocyclohexane is used as basic complexing agent.

Reaction:

$Ra$—$Na+C_2H_4 \rightarrow RH+C_2H_3Na$ does not take place under these conditions since the compound RH has more affinity for sodium than ethylene. The ethylene contained in the liquid at the outlet from the column is simply dissolved and can be recovered by degassing under reduced pressure.

The amount of metallate to use is a function of the content of impurities and is to a first approximation that which could be calculated from the stoichiometry of the reactions. The solvent and even the amine can be recovered if desired, after reaction with water on the liquid emerging from the column.

The gas emerging from the column is thus purified and has all the greater purity as the temperature and the pressure of operation are higher and that the number of plates is greater.

The content of impurities mentioned above can be reduced to less than one part per million for each of these compounds. This is especially the case with acetylene, principal impurity of industrial ethylene. The trials carried out have shown that propyne and butadiene were also very reactant with the metallates considered in the present invention and purification of a stream of propylene or butene can hence be carried out under conditions similar to those of a stream of ethylene.

The purified gas can then be in a column B of active carbon to eliminate any trace of solvent or of amine which could have been entrained or vaporized at the top of the column. Other absorbants can be preferred to the active carbon and refrigeration processes can also be used.

The several examples which follow enable the purification which it is possible to obtain by the process according to the invention to be appreciated.

Figure 2:
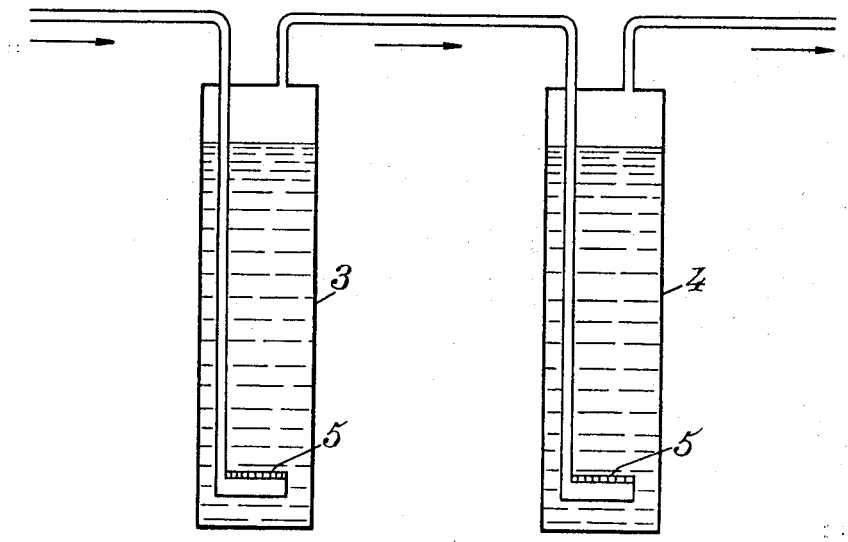
FIG. 2 shows diagrammatically an experimental device used for the later described examples.

The results corresponding to these examples have been obtained by means of the apparatus shown in FIG. 2. Two washing bottles 3 and 4 are connected in series, the gas being dispersed in each bottle by means of sintered glass plates 5 (plates 2 cm. in diameter, diameter of the pores 40 to 90 microns).

In all these trials, the gaseous flow rate has been selected as 100 liters/hour, the temperature was the ambient temperature and the pressure of operation was atmospheric pressure. The concentration of the metallate-amine complex was 0.1 mole/liter of solvent (0.1 mole of metallate +0.1 mole of amine) and was selected to be sufficiently high for it not to undergo a large drop during the duration of a test.

The determination of the contents of $O_2$, $H_2O$, $CO_2$ and CO of the purified gas was not very accurate, but sufficient to check that these contents were less than one part per million. This check was effected for oxygen with the Hersch aparratus for $CO_2$ and CO with a Wösthoff apparatus and for water by weighing tubes of magnesium perchlorate; the detection limits which these methods permitted were in fact of the order of one part per million.

EXAMPLE 1

Metallate: benzylsodium (prepared by the action of toluene on phenylsodium).
Amine: NNN'N'-tetramethylethylene-diamine
Solvent: toluene.

1. Gas to be purified: ethylene+100 p.p.m. of acetylene. The purified gas contains 0.6 p.p.m. of acetylene.
2. Gas to be purified: ethylene+100 p.p.m. of $O_2$ or of $H_2O$ or of $CO_2$ or of CO. The contents in impurities of the purified gas are less than the limits of detection.

EXAMPLE 2

Metallate: sodium compound of 1-methylnaphthalene (obtained by the action of 1-methylnaphthalene on phenylsodium).
Amine: NNN'N'-tetramethylethylene-diamine
Solvent: decaline.

1. Gas to be purified: ethylene+100 p.p.m. of acetylene. The purified gas contains 0.5 p.p.m. of the acetylene.
2. Gas to be purified: ethylene+100 p.p.m. of $O_2$ or $H_2O$ or of $CO_2$ or of CO. The contents in impurities of the purified gas are less than the limits of detection.

EXAMPLE 3

Same conditions as in Example 1 but the NNN'N'-tetramethylenediamine is replaced by NNN"N"N'-pentamethyldiethylenetriamine.

The purified gases contain in the first case 0.5 p.p.m. of of acetylene and in the second case contents of $O_2$, $H_2O$, $CO_2$ or CO less than the limits of detection.

EXAMPLE 4

Same conditions as in Example 1 but the NNN'N'-tetramethylethylenediamine is replaced by NNN'N'-tetramethyl 1,2-diaminocyclohexane. The purified gases contain in the first case 0.6 p.p.m. of acetylene and in the second case contents of $O_2$, $H_2O$, $CO_2$ and CO less than the limits of detection.

EXAMPLE 5

Same conditions as in Example 1 but the benzylsodium is replaced by the metallate of diphenylmethane.

The purified gases contain 0.6 p.p.m. of acetylene and contents of $O_2$, $H_2O$ and $CO_2$ less than the limits of detection but the content of CO is 25 p.p.m.

EXAMPLE 6

Same conditions as in Example 1 but the gas to be purified is propylene to which has been added 100 p.p.m. of propyne (methylacetylene).

The purified gas contains 0.5 p.p.m. of propyne.

EXAMPLE 7

Same conditions as in Example 1 but the gas to be purified is ethylene to which has been added 100 p.p.m. of butadiene.

The purified gas contains 0.5 p.p.m. of butadiene.

EXAMPLE 8

Same conditions as in Example 1 but the gas to purify contains also 1% of hydrogen.

It is noted that the metallate is quantitatively deactivated by the hydrogen; the solution thus deactivated no longer purifies the acetylene nor CO but preserves good activity with regard to $O_2$, $H_2O$ and $CO_2$.

EXAMPLE 9

Same conditions as in Example 5 but the gas to be purified contains in addition 1% of hydrogen.

The metallate of diphenylmethane is no longer quantitatively deactivated by the hydrogen and reacts well with $C_2H_2$, $O_2$, $H_2O$ and $CO_2$; the reactivity with regard to the CO remaining slight.

EXAMPLE 10

Metallate: aniline amide $C_6H_5NHNa$, prepared by reaction of aniline on phenylsodium.
Amine: NNN'N'-tetramethylethylene-diamine
Solvent: toluene.

1. The gas to be purified is ethylene containing 3% of hydrogen and 3% of CO+100 p.p.m. of acetylene. The metallate is not quantitatively attacked by the hydrogen or the CO. The purified gas contains 1.2 p.p.m. acetylene.
2. The gas to be purified is ethylene containing 3% of hydrogen and 3% of CO+100 p.p.m. of $O_2$, $H_2O$ or $CO_2$. The purified gas contains the same amount of hydrogen and of CO. The contents in $O_2$, $H_2O$ or $CO_2$ are less than the limits of detection.

EXAMPLE 11

Metallate: Benzylsodium.
Amine: NNN'N'-tetramethylethylene-diamine.
Solvent: toluene.

1. Gas to be purified: propylene+100 p.p.m. of propyne (methylacetylene). The purified gas contains 0.7 p.p.m. of propyne.
2. Gas to be purified: propylene+100 p.p.m. of $O_2$ or of $H_2O$ or of $CO_2$ or of CO. The contents in impurities of purified gas are less than the limits of detection.

EXAMPLE 12

Metallate: sodium aluminum tetraphenyl NaAl $(C_6H_5)_4$ obtained by reaction of phenylsodium and of aluminum chloride in the presence of NN-dimethylcyclohexylamine.
Solvent: decaline (80%)+NN-dimethylcyclohexylamine (20%).

It is noted that the sodium aluminum tetraphenylene is soluble in this solvent without use of diamine. The solubility limit at 25° C. is greater than 2 moles/liter of solvent.

(a) Gas to be purified: ethylene+100 p.p.m. of acetylene. The purified gas contains 0.9 p.p.m. of acetylene.
(b) Gas to be purified: ethylene+100 p.p.m. of $O_2$ or of $H_2O$ or of CO. The contents in impurities of the purified gas are less than the limits of detection.

As a result of which there is obtained therefore a process of very great efficiency, without notable loss of olefines.

It will also be noted that it enables a simplification of the group of conventional processes of obtaining olefines, which require in any case, as is known, partial hydrogenation of the gaseous charge, for purpose of producing saturation of the acetylenic and diolefinic hydrocarbons which always accompany them, this hydogenation being, of course, distinct from that used in processes previously known and mentioned above, to achieve the purification of the olefines obtained. Due to the fact that of the invention it is not indispensable for the partial hydrogenation, mentioned above, to be very extensive and very selective, the process according to the invention ensuring the easy removing of the acetylenic or diolfinic hydrocarbons remaining in the final charge.

I claim:

1. Process for purifying an olefin or a mixture of olefins containing impurities in the form of traces of oxygen, water, oxides of carbon and acetylenic or diolefinic hydrocarbons, which process comprises contacting the olefin or mixtures of olefins with an organometallic compound having a metal selected from the group consisting of an alkali metal, alkaline earth and aluminum that have a metal-carbon bond derived from a aliphatic or aromatic hydrocarbon in which a metallic atom is replaceable by a mobile hydrogen and thereby removing said impurities from said olefins.

2. Process as claimed in claim 1, wherein the metal of said organometallic compound is an alkali metal.

3. Process as claimed in claim 2, wherein the organometallic compound is supplied in the form of a solution thereof and this solution is contacted with the olefin or mixture of olefins, which is in gaseous form, in a gas-liquid counter-current washing operation whereby purification of the olefin or mixture of olefins, and removal of the organometallic compound solution therefrom, are effected simultaneously and continuously.

4. Process as claimed in claim 2, wherein the organometallic compound is derived from an unsubstituted or alkyl-substituted mono or polycyclic aromatic hydrocarbon.

5. Process as claimed in claim 4, wherein the aromatic hydrocarbon is benzene, naphthalene, 1- or 2-methylnaphthalene or alkyl-benzene.

6. Process as claimed in claim 2, wherein a basic complexing agent consisting of a tertiary mono- or poly-amine is used, together with the organometallic compound, forming a complex of said basic complexing agent and of said organometallic compound, for contacting the olefin or mixture thereof.

7. Process as claimed in claim 6, wherein the amine is a chelating polyamine of the formula:

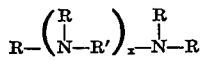

where x=1, 2, 3, or 4, and where R and R' are alkyl or cycloalkyl of up to 6 carbon atoms.

8. Process as claimed in claim 7, wherein the chelating polyamine is selected from the group consisting of a NNN'N' - tetramethylethylenediamine, NNN'N' - pentamethyl-1,2-diaminocyclohexane.

9. Process as claimed in claim 6, wherein said complex is partly or wholly solubilized in an organic solvent, constituted by an aromatic olefinic or saturated hydrocarbon in which the chelate which said amine forms with said organometallic derivative is partly or wholly dissolved.

10. Process as claimed in claim 9, wherein the organic solvent used is a gas-oil fraction or a synthetic mixture of alkylaromatic hydrocarbons.

11. Process as claimed in claim 1, wherein the olefin or mixture of olefins to be purified is ethylene, propylene or butene or a mixture of at least two of these gases.

12. Process as claimed in claim 1, wherein the organometallic compound is the reaction product of (a) a hydrocarbon or organic amine compound having mobile hydrogens with (b) a metal, which metal has reversibly replaced said mobile hydrogens of (a) to form said organometallic compound.

13. Process as claimed in claim 2, wherein the organometallic compound is derived from an amide of a primary or secondary organic amine having at least one substituent at the nitrogen selected from alkyl, cycloalkyl, or aryl.

14. Process as claimed in claim 6, wherein the said amine is a tertiary monoamine and an organoaluminum or an organomagnesium compound is additionally used, to facilitate solubilization of said organoalkali metal compound.

15. Process as claimed in claim 2, wherein said metal is sodium.

16. Process for purifying a gas formed of ethylene, propylene, isobutene, 1-butene, 2-butene or mixtures thereof, containing traces of any of the impurities consisting of oxygen, water, carbon monoxide, carbon dioxide, acetylenic or diolefinic hydrocarbons, which comprises contacting said gas with a medium containing (1) an organoalkali metal compound comprising the reaction product of (a) benzene, naphthalene, methylbenzene, phenylmethylbenzene, methylnaphthalene or phenylmethylnaphthalene and (b) an alkali metal, wherein the alkali metal has reversibly replaced a mobile hydrogen of (a) to form said organoalkali metal compound, (2) a chelating amine selected from the group consisting of N,N,N',N' - tetraalkylmethylene diamine; N,N,N',N'-tetraalkylethylene diamine; N,N,N',N'-tetraalkylpropylene diamine; N,N,N',N'-tetraalkyl-1,2-diaminocyclohexane; in which the alkyl groups are selected from the groups consisting of methyl, ethyl, propyl, butyl and N,N,N',N''-pentamethyldiethylenetriamine and removing said impurities from said gaseous stream.

17. Process as claimed in claim 13, wherein said organoalkali derivative is an amide of aniline.

18. Process as claimed in claim 14, wherein said tertiary amine is selected from the group consisting of trimethylamine, tripropylamine, tributylamine, N,N-dimethylcyclohexylamine, triethylenediamine and quinuclidine.

References Cited
UNITED STATES PATENTS

| | | | |
|---|---|---|---|
| 3,598,881 | 8/1971 | Kniel et al. | 260—677 A |
| 3,696,162 | 10/1972 | Kniel et al. | 260—677 A |
| 3,055,732 | 9/1962 | DeLassus et al. | |

DELBERT E. GANTZ, Primary Examiner

J. M. NELSON, Assistant Examiner

U.S. Cl. X.R.

260—681.5; 55—68

CERTIFICATE OF CORRECTION

Patent No. 3,840,611                    Dated October 8, 1974

Inventor(s) Georges Gau

It is certified that error appears in the above-identified patent and that said Letters Patent are hereby corrected as shown below:

Column 7, line 17
delete the word                 "diolfinic"

and substitute therefor         --diolefinic--.

Column 7, lines 63 and
64 (Claim 8) delete             "NNN'N'-tetramethylethylene-
                                diamine, NNN'N'-pentamethyl-
                                1,2-diaminocyclohexane.-- and insert therefor             --NNN'N'-tetramethylethylene-
                                diamine, NNN'N'-pentamethyl-
                                diethylenetriamine and NNN'N'-
                                tetramethyl-1,2-diaminocyclo-
                                hexane.--

Column 8, line 53
(Claim 18) delete               "trimethylamine"

and insert therefor             --triethylamine--.

Signed and sealed this 7th day of January 1975.

(SEAL)
Attest:

McCOY M. GIBSON JR.             C. MARSHALL DANN
Attesting Officer               Commissioner of Patents